United States Patent [19]
Henrick

[11] 3,887,592
[45] June 3, 1975

[54] 2-HYDROXY OR ACETOXY SUBSTITUTED ESTERS USEFUL FOR THE CONTROL OF INSECTS

[75] Inventor: Clive A. Henrick, Palo Alto, Calif.

[73] Assignee: Zoecon Corporation, Palo Alto, Calif.

[22] Filed: Jan. 14, 1974

[21] Appl. No.: 433,410

Related U.S. Application Data

[62] Division of Ser. No. 205,344, Dec. 6, 1971, Pat. No. 3,803,187.

[52] U.S. Cl............ 260/399; 260/405; 260/410.9 R; 260/DIG. 44
[51] Int. Cl. .................... C07c 69/62; A01n 9/24
[58] Field of Search...... 260/DIG. 44, 410.9 R, 399, 260/405

[56] References Cited
UNITED STATES PATENTS

| | | | |
|---|---|---|---|
| 2,928,854 | 3/1960 | Bolhofer | 260/413 |
| 3,657,291 | 4/1972 | Jarolim et al. | 260/408 |
| 3,803,187 | 4/1974 | Henrick | 260/408 |

*Primary Examiner*—Donald G. Daus
*Assistant Examiner*—Diana G. Rivers
*Attorney, Agent, or Firm*—Lee-Louise H. Priest; Donald W. Erickson

[57] ABSTRACT

Novel olefinic unsaturated esters substituted at C-2 with chloro, hydroxy, acyloxy, oxo or amino, syntheses of $\alpha,\beta$-unsaturated esters, intermediates therefor and the control of insects.

8 Claims, No Drawings

2-HYDROXY OR ACETOXY SUBSTITUTED ESTERS USEFUL FOR THE CONTROL OF INSECTS

This is a division of application Ser. No. 205,344, filed Dec. 6, 1971, now U.S. Pat. No. 3,803,187.

This invention relates to novel compounds, intermediates therefor, syntheses and the control of insects. More particularly, the present invention provides novel compounds of formula A which are useful agents for the control of insects and valuable intermediates for the preparation of insect control agents.

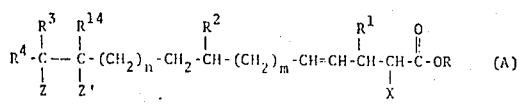

wherein, each of $m$ and $n$ is zero or the positive integer one, two or three;

each of R, $R^1$, $R^2$, $R^3$ and $R^4$ is lower alkyl;

$R^{14}$ is hydrogen or lower alkyl;

X is chloro, hydroxy or lower acyloxy;

Z is hydrogen, lower alkyl, lower alkoxy or lower alkylthio; and

Z' is hydrogen or, taken with Z, a carbon-carbon bond.

In the description hereinafter, each of $m$, $n$, R-$R^4$, $R^{14}$, X, Z and Z' is as defined above, unless otherwise specified.

In one embodiment of the present invention, there is provided novel 2-chloro compounds of formula A' which can be prepared as outlined below.

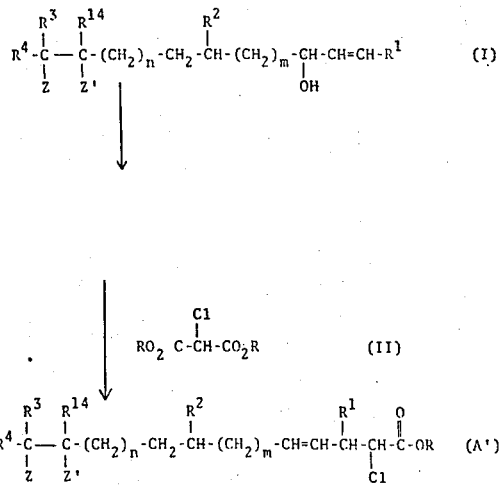

In the practice of the above synthesis, an allylic alcohol of formula I is reacted with a chloro diester of formula II in the presence of a basic catalyst such as aluminum isopropoxide, sodium methylate, potassium methylate, sodium ethylate, sodium isopropylate, sodium butylate, and the like to prepare a 2-chloro ester of formula A'. The reaction is generally practiced at an elevated temperature of from about 100° to 225°C or higher, usually 150°–200°C. The reaction is practiced utilizing molecular seives, spinning band column, or the like to remove alcohol formed during the reaction. A gas meter is often utilized to measure the evolution of carbon dioxide. Cessation of the evolution of alcohol and $CO_2$ indicates completion of the reaction. Suitable procedures are described by Tavel, *Helv. Chim. Acta* 33, No. 163, 1266 (1950) and Hoffman, et al, *Ann. Chem.* 729, 52 (1969).

A 2-chloro ester of formula A' can be prepared also by the reaction of an allylic alcohol of formula I with a tri-alkyl ortho chloro acetate of formula III in the presence of a catalyst such as propionic acid, 2,4-dinitrophenol, and the like at a temperature of about 100°–200°C.

$$(RO)_3—C—CH_2—Cl \qquad (III)$$

A 2-chloro ester of formula A' in accordance with the present invention is dehydrochlorinated to form useful insect control agents of formula B:

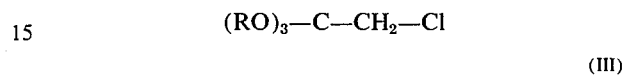

The dehydrochlorination can be carried out by heating a 2-chloro ester of formula A' in s-collidine, pyridine or the like at a temperature of about 125°–200°C. The dehydrochlorination can be practiced also by heating a 2-chloro ester in an organic solvent such as dimethylformamide, N-methylpyrrolidone or dimethylsulfoxide in the presence of alkaline earth or alkali metal carbonate.

In another embodiment of the present invention, a 2-chloro ester of formula A' is converted into a 2-acyloxy compound of formula A'' (R' is lower acyl) which is useful for the control of insects and as an intermediate for the preparation of α,β-unsaturated esters of formula B.

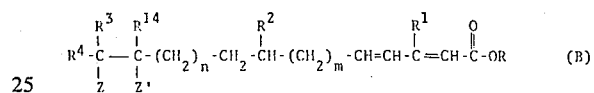

A 2-acyloxy compound of formula A'' is prepared from a 2-chloro ester of formula A' by reaction of an alkali-metal carboxylate such as potassium acetate, potassium propionate, and the like in an aqueous alcohol such as aqueous ethanol. The reaction is conducted at a temperature of from about 0°–25°C. A 2-acyloxy compound of formula A'' on pyrolysis provides an α,β-unsaturated ester of formula B. A suitable procedure for pyrolysis of the 2-acyloxy compounds is described by Greenwood, *J. Org. Chem.* 27, 2308 (1962). The pyrolysis is conducted by using oxygen-free nitrogen to carry the 2-acyloxy compound through a pyrolysis tube with the helices at a temperature of about 400°–500°C.

In another embodiment of the present invention, there is provided novel 2-hydroxy-compounds of formula A (X is hydroxy) which are prepared by mild hydrolysis of a 2-acyloxy compound of formula A'' using potassium carbonate, potassium bicarbonate or other base in aqueous alcohol such as aqueous methanol, ethanol, and the like. The reaction is conducted at a temperature of about 0°–20°C. The 2-hydroxy compounds of formula A, in addition to their utility as insect control agents, serve as precursors for the preparation of novel 2-oxo compounds of formula IV which are active agents for the control of insects.

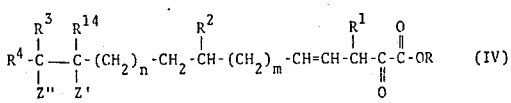

The oxidation of a 2-hydroxy compound of formula A to a 2-oxo compound of formula IV can be accomplished using an oxidizing agent such as chromium trioxide-2 pyridine complex in methylene dichloride at about 0°. An excess of the chrominum trioxide-pyridine complex is used. The oxidation can be accomplished also by use of manganese dioxide in chloroform for several hours. During the oxidation, if Z represents a lower alkythio group in the precursor (A wherein X is hydroxy), it is oxidized to a lower alkylsulfonyl group (Z'').

In another embodiment of the present invention, there is prepared novel 2-amino compounds of formula V which are useful for the control of insects (each of $R^5$ and $R^6$ is hydrogen or lower alkyl).

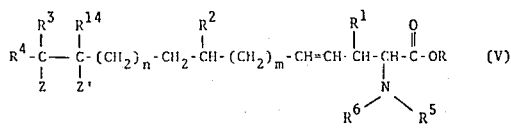

The 2-amino compounds of formula V are prepared by the reaction of a 2-chloro ester of formula A' with an excess of amine in an organic solvent such as an ether solvent or hydrocarbon solvent at low temperature such as about 0°.

The starting material of formula I can be prepared by the reaction of an aldehyde of formula VI with a Grignard of a halide of formula VII (X' is bromo, chloro or iodo) using conventional Grignard methods.

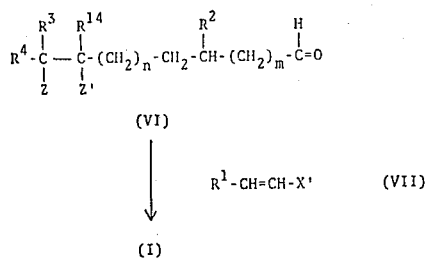

The aldehydes of formula VI are described in applications Ser. No. 187,897, filed Oct. 8, 1971; Ser. No. 187,898, filed Oct. 8, 1971, now U.S. Pat. Nos. 3,755,411 and 3,752,843, respectively; and Ser. No. 201,189, filed Nov. 22, 1971, now abandoned the disclosures of which are incorporated by reference.

The compounds of the present invention of formula A, IV and V are useful for the control of insects. The utility of these compounds as insect control agents is believed to be attributable to their juvenile hormone activity. They are preferably applied to the immature insect in view of their effect on metamorphosis and otherwise cause abnormal development leading to death or inability to reproduce. Typical insects on which the compounds of the present invention are active include Hemipteran such as Lygaeidae and Miridae; Coleopteran such as Tenebrionidae and Dermestidae; Lepidopteran such as Pyralidae and Gelechiidae; Dipteran such as mosquitoes and flies; Homopteran such as aphids; and other insects. The compounds of the present invention can be applied at low dosage levels of the order of 0.01 µg. to 25.0 µg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of formula A. Generally, a concentration of less than 25 % of the active compound is employed. The formulations can include insect attractants, emulsifying agents or wetting agents to assist in the application and effectiveness of the active ingredient.

The term "lower alkyl," as used herein, refers to an alkyl group, branched or straight, having a chain length of one to six carbon atoms. The term "lower alkoxy" refers to an alkoxy group of one to six carbon atoms such as methoxy, ethoxy, isopropoxy, and the like. The term "lower alkylthio" refers to an alkylthio group of one to six carbon atoms such as methylthio, ethylthio, isopropylthio, and the like. The term "lower acyloxy" refers to a hydrocarbon carboxylic acyloxy group of one to six carbon atoms such as acetoxy and isopropionoxy.

The following examples are provided to illustrate the present invention. Temperature is given in degrees Centigrade.

EXAMPLE 1

To a mixture of 12.7 g. of 6,10-dimethylundec-2-en-4-ol and 13.0 g. of diethyl 2-chloromalonate is added 0.02 g. of aluminum isopropoxide. The reaction mixture is heated under a spinning band column at 170°–180° with continuous removal of ethanol as it forms. The reaction is continued until evolution of carbon dioxide ceases and substantially all ethanol is removed. After cooling, the crude product is fractionally distilled to yield ethyl-2-chloro-3,7,11-trimethyldodec-4-enoate.

EXAMPLE 2

A solution of 19.8 g. of 6,10-dimethylundec-2-en-4-ol, 25.2 g. of diethyl 2-chloromalonate and 0.27 g. of sodium methylate is heated at 180°–200° with continuous removal of ethanol. The reaction is continued until ethanol is removed and evolution of carbon dioxide stops. After cooling, ether is added and the mixture washed with water and dried. Ether is removed under reduced pressure and the concentrate fractionally distilled to give ethyl 2-chloro-3,7,11-trimethyldodec-4-enoate.

EXAMPLE 3

Each of di-isopropyl 2-chloromalonate and dimethyl 2-chloromalonate is reacted with 6,10-dimethylundec-2-en-4-ol to prepare isopropyl 2-chloro-3,7,11-trimethyldodec-4-enoate and methyl 2-chloro-3,7,11-trimethyldodec-4-enoate, respectively.

EXAMPLE 4

A mixture of 10 g. of ethyl 2-chloro-3,7,11-trimethyldodec-4-enoate and 1.5 molar equivalents of s-collidine is heated at 150°–170° for about 2 hours. After cooling, ether is added and the mixture washed with cold dilute hydrochloric acid, brine and aqueous sodium bicarbonate. The mixture is dried over sodium sulfate, ether evaporated and the concentrate fractionally distilled to give ethyl 3,7,11-trimethyldodeca-2,4-dienoate.

EXAMPLE 5

A solution of 10 g. of ethyl 2-chloro-3,7,11-trimethyldodec-4-enoate, 100 ml. of dimethylformamide and one g. of potassium carbonate is heated at 100°–115° for about 2 hours. After cooling, ether is added followed by water. The organic phase is separated, washed with water and brine, dried and evaporated to yield ethyl 3,7,11-trimethyldodeca-2,4-dienoate which is purified by fractional distillation.

EXAMPLE 6

To a solution of 1.5 g. of potassium acetate in 50 ml. of aqueous ethanol (1:2) is added 3 g. of ethyl 2-chloro-3,7,11-trimethyldodec-4-enoate. The reaction mixture is stirred at 20°–25° until the reaction is complete as followed by thin layer chromatography. The mixture is then diluted with water and extracted with ether. The combined ether extracts are washed with water and brine, dried over sodium sulfate and evaporated under reduced pressure to yield ethyl 2-acetoxy-3,7,11-trimethyldodec-4-enoate which can be purified by chromatography.

EXAMPLE 7

A mixture of one gram of ethyl 2-acetoxy-3,7,11-trimethyldodec-4-enoate, 1.5 molar equivalents of potassium carbonate and 50 ml. of aqueous ethanol (1:4) is stirred at 15°–20° until hydrolysis of the acetate is complete as followed by thin layer chromatography. Then the mixture is diluted with water followed by extraction with ether. The combined ether extracts are washed with water, dried over calcium sulfate and evaporated to yield ethyl 2-hydroxy-3,7,11-trimethyldodec-4-enoate which can be purified by chromatography.

EXAMPLE 8

Using the procedure of Greenwood, J. Org. Chem. 27, 2308 (July 1962), ethyl 2-acetoxy-3,7,11-trimethyldodec-4-enoate is pyrolyzed using a tube maintained at 400° and passage of the ester by flow of oxygen-free nitrogen to provide a residence rate in the tube of 3.5 seconds. The pyrolysate is taken up in pentane, washed with water and brine quickly, and solvent evaporated to give crude ethyl 3,7,11-trimethyldodeca-2,4-dienoate which is purified by fractional distillation.

EXAMPLE 9

A mixture of 3 g. of ethyl 2-hydroxy-3,7,11-trimethyldodec-4-enoate, 1.5 molar equivalents of manganese dioxide and 50 ml. of chloroform is prepared at 0°, under nitrogen, by slow addition to manganese dioxide. The reaction mixture is allowed to stand for about 24 hours with stirring and then is filtered. The filter cake is washed with hexane and the combined washings and filtrate evaporated to give crude ethyl 2-oxo-3,7,11-trimethyldodec-4-enoate which can be purified by chromatography.

EXAMPLE 10

To a solution of 6 molar equivalents of chromium trioxide-2 pyridine complex in 100 ml. of methylene dichloride, under nitrogen and at 0°, is added a solution of 4.0 g. of ethyl 2-hydroxy-3,7,11-trimethyldodec-4-enoate in methylene dichloride. After addition is complete, the mixture is stirred one hour at 0° and then poured into sat. sodium bicarbonate and extracted with methylene chloride. The combined methylene dichloride extracts are washed with water and brine, dried over calcium sulfate and evaporated under reduced pressure to give ethyl 2-oxo-3,7,11-trimethyldodec-4-enoate which can be purified by chromatography.

EXAMPLE 11

A mixture of 3 g. of ethyl 2-chloro-3,7,11-trimethyldodec-4-enoate, 2.4 molar equivalents of diethylamine and 60 ml. of ether is stirred overnight (about 17 hours) at 0°. The mixture is then washed with water, dried over calcium sulfate and evaporated under reduced pressure to yield ethyl 2-diethylamino-3,7,11-trimethyldodec-4-enoate.

EXAMPLE 12

Five grams of ethyl 2-chloro-3,7,11-trimethyldodec-4-enoate and 50 ml. of benzene, cooled to 5°, is saturated with ammonia. The mixture is then stirred for eight hours while maintaining dry conditions. After the mixture is warmed to room temperature, it is washed with dilute sodium hydroxide and then evaporated under reduced pressure to yield ethyl 2-amino-3,7,11-trimethyldodec-4-enoate.

EXAMPLE 13

A mixture of 9.0 g. of 6,10-dimethylundec-2-en-4-ol, 42 g. of triethyl orthochloroacetate, and 0.36 g. of propionic acid is prepared and then refluxed under a spinning band column to remove ethanol as it forms. After the elimination of ethanol is about complete, the crude reaction product is fractionally distilled to yield ethyl 2-chloro-3,7,11-trimethyldodec-4-enoate.

EXAMPLE 14

The reaction of Example 1 is repeated using an equivalent amount of each of 6,10-dimethylundeca-2,9-dien-4-ol, 10-methoxy-6,10-dimethylundec-2-en-4-ol, 6,10,10-trimethylundec-2-en-4-ol and 6,9,10-trimethylundec-2-en-4-ol in place of 6,10-dimethylundec-2-en-4-ol to prepare
ethyl 2-chloro-3,7,11-trimethyldodeca-4,10-dienoate,
ethyl 2-chloro-11-methoxy-3,7,11-trimethyldodec-4-enoate,
ethyl 2-chloro-3,7,11,11-tetramethyldodec-4-enoate and ethyl 2-chloro-3,7,10,11-tetramethyldodec-4-enoate, respectively.

Dehydrochlorination of the thus-prepared 2-chloroesters provides the corresponding α,β-unsaturated esters.

EXAMPLE 15

To 12 g. of magnesium turnings in 100 ml. of dry tetrahydrofuran, under argon, is added about 2.0 g. of prop-1-enyl bromide. Addition of iodine initiates the reaction and then 60 g. of prop-1-enyl bromide in dry tetrahydrofuran is added slowly. Additional tetrahydrofuran is added to total volume of about 250 ml.

To the Grignard solution is added 78 g. of 3,7-dimethyloctan-1-al slowly, with stirring. After addition is complete, the reaction mixture is stirred for an additional 16 hours and then about 50 ml. of sat. ammonium chloride is added and the mixture filtered. The filtrate is concentrated under reduced pressure and then taken up in ether. The ethereal phase is washed with sat. brine, dried over magnesium sulfate and solvent evaporated to yield 6,10-dimethyl-4-hydroxyundec-2-ene.

The above reaction is repeated using an equivalent amount of each of 3,7,-dimethyloct-6-en-1-al, 7-methoxy-3,7-dimethyloctan-1-al, 3,7,7-trimethyloctan-1-al, 3,6,7-trimethyloctan-1-al, 6-methoxy-3,5,6-trimethylheptan-1-al, 3,6-dimethylheptan-1-al, 6-methoxy-3,6-dimethylheptan-1-al and 3,5,6-trimethylheptan-1-al to prepare the respective allylic alcohol, i.e., - 6,10-dimethyl-4-hydroxyundeca-2,9-diene, 10-methoxy-6,10-dimethyl-4-hydroxyundec-2-ene, 6,10,10-trimethyl-4-hydroxyundec-2-ene 4-hydroxy-6,9,10-trimethylundec-2-ene, 9-methoxy-4-hydroxy-6,8,9-trimethyldec-2-ene, 6,9-dimethyl-4-hydroxydec-2-ene, 9-methoxy-4-hydroxydec-2-ene and 6,8,9-trimethyl-4-hydroxydec-2-ene.

EXAMPLE 16

A mixture of 23 g. of lithium propynylide and 350 ml. of absolute dimethylformamide is cooled in an ice-bath. To the cooled mixture is added a solution of 30 g. of 3,7-dimethyloctan-1-al and 150 ml. of dimethylformamide slowly. The reaction mixture is allowed to stand overnight (about 16 hours) and then 250 ml. of ammonium chloride (2N) is added followed by extraction with ether. The combined ether extracts are concentrated under reduced pressure to remove solvent. The crude product (6,10-dimethylundeca-2-yn-4-ol) can be purified by spinning band distillation.

Synthetic quinoline (21 drops) and 4.5 g. of Lindlar catalyst are added to 14.0 g. of 6,10-dimethylundeca-2-yn-4-ol in 150 ml. of pentane (purified over permanganate) and the system evacuated and filled with hydrogen. The alkyne absorbs about 1.5 liters of hydrogen at room temperature before starting material disappears as indicated by gas chromatography. Celite is added to the mixture and then filtered. The filtrate is washed with 2N sulfuric acid to eliminate quinoline. The organic layer is washed with water and sat. brine, dried over calcium sulfate and evaporated to give 6,10-dimethylundec-2-en-4-ol which can be purified by chromatography.

By use of the process of this example, other aldehydes of formula VI can be converted into the respective allylic alcohol of formula I.

EXAMPLE 17

Citronellal (47.7 g.) in ether (50 ml.) is slowly added at 0° to a solution of lithium propenylide (prepared from 32.5 g. of propenyl bromide and 3.45 g. of lithium in 500 ml. of ether according to the method of Braude and Coles, J. Chem. Soc. p. 2078, 1951). After addition is complete, the reaction mixture is stirred overnight (about 18 hours) and then 250 ml. of sat. aqueous ammonium chloride is added. The mixture is filtered and the ether layer separated, dried and evaporated to give 6,10-dimethylundec-2-en-4-ol which can be purified by distillation or chromatography.

The process of this example can be used to prepare other allylic alcohols of formula I from the aldehydes of formula VI.

Propenyl lithium can be prepared also by the method of Seyferth and Vaughan, J. Am. Chem. Soc. 86, 883 (1964).

EXAMPLE 18

Using the procedure of Example 1 or 2, each of
10-methylthio-6,10-dimethylundec-2-en-4-ol,
10-ethylthio-6,10-dimethylundec-2-en-4-ol,
10-ethoxy-6,10-dimethylundec-2-en-4-ol,
10-methoxy-6,10-dimethyldodec-2-en-4-ol, and
6,10-dimethyldodec-2-en-4-ol is converted into
ethyl 11-methylthio-2-chloro-3,7,11-trimethyldodec-4-enoate,
ethyl 11-ethylthio-2-chloro-3,7,11-trimethyldodec-4-enoate,
ethyl 11-ethoxy-2-chloro-3,7,11-trimethyldodec-4-enoate,
ethyl 11-methoxy-2-chloro-3,7,11-trimethyltridec-4-enoate, and
ethyl 2-chloro-3,7,11-trimethyltridec-4-enoate, respectively.

EXAMPLE 19

Following the procedure of Example 6, each of the 2-chloro esters of Examples 14 and 18 is converted into the respective 2-acetate, namely -
ethyl 2-acetoxy-3,7,11-trimethyldodeca-4,10-dienoate,
ethyl 2-acetoxy-11-methoxy-3,7,11-trimethyldodec-4-enoate,
ethyl 2-acetoxy-3,7,11,11-tetramethyldodec-4-enoate,
ethyl 2-acetoxy-3,7,10,11-tetramethyldodec-4-enoate,
ethyl 2-acetoxy-11-methylthio-3,7,11-trimethyldodec-4-enoate,
ethyl 2-acetoxy-11-ethylthio-3,7,11-trimethyldodec-4-enoate,
ethyl 2-acetoxy-11-ethoxy-3,7,11-trimethyldodec-4-enoate,
ethyl 2-acetoxy-11-methoxy-3,7,11-trimethyltridec-4-enoate, and
ethyl 2-acetoxy-3,7,11-trimethyltridec-4-enoate.

In the same way, isopropyl 2-acetoxy-3,7,11-trimethyldodec-4-enoate and isopropyl 2-acetoxy-11-methoxy-3,7,11-trimethyldodec-4-enoate are prepared from the 2-chloro precursor.

EXAMPLE 20

Each of the 2-acetates of Example 19 is converted into the corresponding 2-hydroxy compound listed below by mild hydrolysis using potassium carbonate.
ethyl 2-hydroxy-3,7,11-trimethyldodeca-4,10-dienoate ethyl 2-hydroxy-11-methoxy-3,7,11-trimethyldodec-4-enoate
ethyl 2-hydroxy-3,7,11,11-tetramethyldodec-4-enoate
ethyl 2-hydroxy-3,7,10,11-tetramethyldodec-4-enoate
ethyl 2-hydroxy-11-methylthio-3,7,11-trimethyldodec-4-enoate
ethyl 2-hydroxy-11-ethylthio-3,7,11-trimethyldodec-4-enoate
ethyl 2-hydroxy-11-ethoxy-3,7,11-trimethyldodec-4-enoate
ethyl 2-hydroxy-11-methoxy-3,7,11-trimethyltridec-4-enoate
ethyl 2-hydroxy-3,7,11-trimethyltridec-4-enoate
isopropyl 2-hydroxy-3,7,11-trimethyldodec-4-enoate
isopropyl 2-hydroxy-11-methoxy-3,7,11-trimethyldodec-4-enoate

EXAMPLE 21

Following the process of either Example 9 or 10, each of the 2-hydroxy-compounds of Example 20 is oxidized to the 2-oxo compound below.
ethyl 2-oxo-3,7,11-trimethyldodeca-4,10-dienoate
ethyl 2-oxo-11-methoxy-3,7,11-trimethyldodec-4-enoate
ethyl 2-oxo-3,7,11,11-tetramethyldodec-4-enoate
ethyl 2-oxo-3,7,10,11-tetramethyldodec-4-enoate
ethyl 2-oxo-11-methylsulfonyl-3,7,11-trimethyldodec-4-enoate
ethyl 2-oxo-11-ethylsulfonyl-3,7,11-trimethyldodec-4-enoate
ethyl 2-oxo-11-ethoxy-3,7,11-trimethyldodec-4-enoate
ethyl 2-oxo-11-methoxy-3,7,11-trimethyltridec-4-enoate
ethyl 2-oxo-3,7,11-trimethyltridec-4-enoate
isopropyl 2-oxo-3,7,11-trimethyldodec-4-enoate
isopropyl 2-oxo-11-methoxy-3,7,11-trimethyldodec-4-enoate

EXAMPLE 22

Ethylamine is reacted with each of the 2-chloro compounds of Example 14 and 18 using the procedure of Example 11 to prepare the respective 2-ethylamino compound, i.e.,
ethyl 2-ethylamino-3,7,11-trimethyldodeca-4,10-dienoate
ethyl 2-ethylamino-11-methoxy-3,7,11-trimethyldodec-4-enoate
ethyl 2-ethylamino-3,7,11,11-tetramethyldodec-4-enoate
ethyl 2-ethylamino-3,7,10,11-tetramethyldodec-4-enoate
ethyl 2-ethylamino-11-methylthio-3,7,11-trimethyldodec-4-enoate
ethyl 2-ethylamino-11-ethylthio-3,7,11-trimethyldodec-4-enoate
ethyl 2-ethylamino-11-ethoxy-3,7,11-trimethyldodec-4-enoate
ethyl 2-ethylamino-11-methoxy-3,7,11-trimethyltridec-4-enoate
ethyl 2-ethylamino-3,7,11-trimethyltridec-4-enoate In the same way, there is prepared isopropyl 2-ethylamino-3,7,11-trimethyldodec-4-enoate and isopropyl 2-ethylamino-11-methoxy-3,7,11-trimethyldodec-4-enoate from the 2-chloro precursor.

By reacting isopropylamine, diethylamine or methylethylamine with each of the 2-chloro compounds of formula A' such as the 2-chloro compounds of Examples 14 and 18, the respective 2-isopropylamino, 2-diethylamino and 2-methylethylamino compounds of formula V are prepared, e.g., ethyl 2-isopropylamino-11-methoxy-3,7,11-trimethyldodec-4-enoate, ethyl 2-diethylamino-11-methoxy-3,7,11-trimethyldodec-4-enoate and ethyl 2-methylamino-11-methoxy-3,7,11-trimethyldodec-4-enoate.

What is claimed is:

1. A compound selected from those of formula (A):

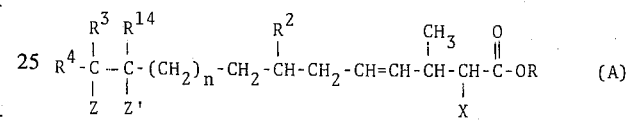

wherein,
$n$ is zero or the positive integer one;
each of $R^2$, $R^3$ and $R^4$ is methyl or ethyl;
$R^{14}$ is hydrogen or methyl;
R is lower alkyl;
X is hydroxy or acetoxy;
Z is hydrogen, lower alkyl, lower alkoxy or lower alkylthio; and
Z' is hydrogen, or taken with Z, a carbon-carbon bond.

2. A compound according to claim 1 wherein R is lower alkyl of one to three carbon atoms.

3. A compound according to claim 2 wherein Z is hydrogen, methyl, methoxy or methylthio and Z' is hydrogen.

4. A compound according to claim 3 wherein $n$ is one, $R^{14}$ is hydrogen, and each of $R^2$, $R^3$ and $R^4$ is methyl.

5. A compound according to claim 4 wherein X is hydroxy and R is methyl, ethyl, or isopropyl.

6. A compound according to claim 5 wherein Z is hydrogen.

7. A compound according to claim 4 wherein X is acetoxy and R is methyl, ethyl or isopropyl.

8. A compound according to claim 7 wherein Z is hydrogen.

* * * * *